US010567171B2

(12) United States Patent
Schroeder et al.

(10) Patent No.: US 10,567,171 B2
(45) Date of Patent: Feb. 18, 2020

(54) CLIENT-SIDE SECURITY KEY GENERATION

(71) Applicant: Shape Security, Inc., Mountain View, CA (US)

(72) Inventors: Carl Schroeder, Los Altos, CA (US); Ariya Hidayat, Mountain View, CA (US); Chandrasekhar Rentachintala, Sunnyvale, CA (US); Ricky Y. Chiu, Palo Alto, CA (US)

(73) Assignee: Shape Security, Inc., Santa Clara, CA (US)

( * ) Notice: Subject to any disclaimer, the term of this patent is extended or adjusted under 35 U.S.C. 154(b) by 229 days.

(21) Appl. No.: 15/640,399

(22) Filed: Jun. 30, 2017

(65) Prior Publication Data

US 2018/0006814 A1    Jan. 4, 2018

Related U.S. Application Data

(60) Provisional application No. 62/357,339, filed on Jun. 30, 2016.

(51) Int. Cl.
*G06F 21/00* (2013.01)
*H04L 29/06* (2006.01)
(Continued)

(52) U.S. Cl.
CPC .............. *H04L 9/0877* (2013.01); *H04L 9/06* (2013.01); *H04L 9/0819* (2013.01); *H04L 9/0838* (2013.01); *H04L 9/3234* (2013.01)

(58) Field of Classification Search
CPC ..... H04L 9/0877; H04L 9/321; H04L 9/0838; H04L 9/06; H04L 9/3234; H04L 9/0819
See application file for complete search history.

(56) References Cited

U.S. PATENT DOCUMENTS 9,008,620 B2    4/2015    Ho
9,313,203 B2    4/2016    Adler
(Continued)

FOREIGN PATENT DOCUMENTS

WO    WO-2016209950 A1 *    12/2016    ............. H04L 29/06

OTHER PUBLICATIONS

Andy Sayler, Taylor Andrews, Matt Monaco, Dirk Grunwald; "Tutamen: A Next-Generation Secret-Storage Platform"; Oct. 2016; SoCC '16: Proceedings of the Seventh ACM Symposium on Cloud Computing; Publisher: ACM; pp. 251-264 (Year: 2016).*
(Continued)

*Primary Examiner* — Kendall Dolly
*Assistant Examiner* — Courtney D Fields
(74) *Attorney, Agent, or Firm* — Wei & Sleman LLP

(57) ABSTRACT

Techniques are provided for client-side security key generation. An initial request is received from an application executing on a client device. The application includes a security component includes security code. In response to the initial request, a key component is generated. The key component includes one or more parameters from which a valid security key can be generated at the client device by executing the security code. The key component is provided to the client device. A security key associated with a request from the client device to an application server is received. The security key is checked for validity. In response to determining that the security key is valid, processing of the request by the application server is caused.

18 Claims, 6 Drawing Sheets

(51) Int. Cl.
*H04L 9/08* (2006.01)
*H04L 9/06* (2006.01)
*H04L 9/32* (2006.01)
*G06F 12/14* (2006.01)

(56) References Cited

U.S. PATENT DOCUMENTS

| | | |
|---|---|---|
| 9,680,850 B2 | 6/2017 | Rapaport |
| 2010/0031315 A1 | 2/2010 | Feng |
| 2011/0302424 A1 | 12/2011 | Horne |
| 2012/0011262 A1 | 1/2012 | Cheng |
| 2012/0090030 A1 | 4/2012 | Rapaport |
| 2013/0086669 A1 | 4/2013 | Sondhi |
| 2014/0007048 A1 | 1/2014 | Qureshi |
| 2014/0089786 A1 | 3/2014 | Hashmi |
| 2014/0259145 A1 | 9/2014 | Khandelwal |
| 2016/0080345 A1* | 3/2016 | Safruti ............... H04L 67/02 726/6 |
| 2017/0346851 A1* | 11/2017 | Drake ............... H04L 63/1466 |
| 2018/0091492 A1 | 3/2018 | Hidayat et al. |
| 2018/0241774 A1 | 8/2018 | Zhao |

OTHER PUBLICATIONS

NOA, dated Aug. 11, 2016, re: Justin Call, U.S. Appl. No. 14/563,336, filed Dec. 8, 2014.

CTNF, dated Mar. 25, 2016, re: Justin Call, U.S. Appl. No. 14/563,336, filed Dec. 8, 2014.

CTNF, dated Oct. 18, 2018, re: Yao Zhao, U.S. Appl. No. 15/959,920, filed Apr. 23, 2018.

NOA, dated Feb. 15, 2019, re: Yao Zhao, U.S. Appl. No. 15/959,920, filed Apr. 23, 2018.

CTNF, dated Apr. 16, 2019, re: Carl Schroeder, U.S. Appl. No. 15/640,399, filed Jun. 30, 2017.

CTNF, dated Apr. 5, 2019, re: Ariya Hidayat, U.S. Appl. No. 15/563,509, filed Sep. 29, 2017.

International Search Report, dated Feb. 4, 2016, PCT/US15/63811, Shape.

* cited by examiner

CLIENT-SIDE SECURITY KEY GENERATION

CROSS-REFERENCE TO RELATED APPLICATIONS; BENEFIT CLAIM

This application claims the benefit of Provisional Appln. 62/357,339, filed Jun. 30, 2016, the entire contents of which is hereby incorporated by reference as if fully set forth herein, under 35 U.S.C. § 119(e).

FIELD OF THE DISCLOSURE

The present disclosure generally relates to security techniques applicable to client/server systems, and relates more specifically to client-side security key generation by an application using an integrated security component.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Attackers may use software, often referred to as a "bot" or "headless browser", which imitates a Ruser by receiving instructions from a web server and autonomously generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters that correspond to fields in a web page to simulate a user submitting data to a web server through a browser.

Attackers may use bots to commit many types of unauthorized acts, crimes or computer fraud, such as web site or content scraping, ratings manipulation, fake account creation, reserving rival goods attacks, ballot stuffing attacks, password snooping, vulnerability assessments, brute force attacks, click fraud, denial-of-service (DoS) attacks, bidding wars, and system fingerprinting attacks. As a specific example, a malicious user may cause a bot to quickly reserve products that are being offered for sale through a particular web site.

It is relatively common, for example, for illicit organi*zations to place malware on client computers (e.g. smartphones, tablets, laptops, or desktops) owned by law-abiding people, such as to control those client computers to institute a or to intercept communications between the client and its user, or between the client and a server from which it is getting information and to which it is providing information. For example, such malware may, using a "man in the middle" attack, generate displays in a web browser that look like the legitimate displays from a bank or retail web site, but that act to induce a user to disclose private information (e.g, bank account or credit card information) that the malware then intercepts and forwards to people who will use the information for illicit gain (e.g. identity theft).

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

Figure 1:
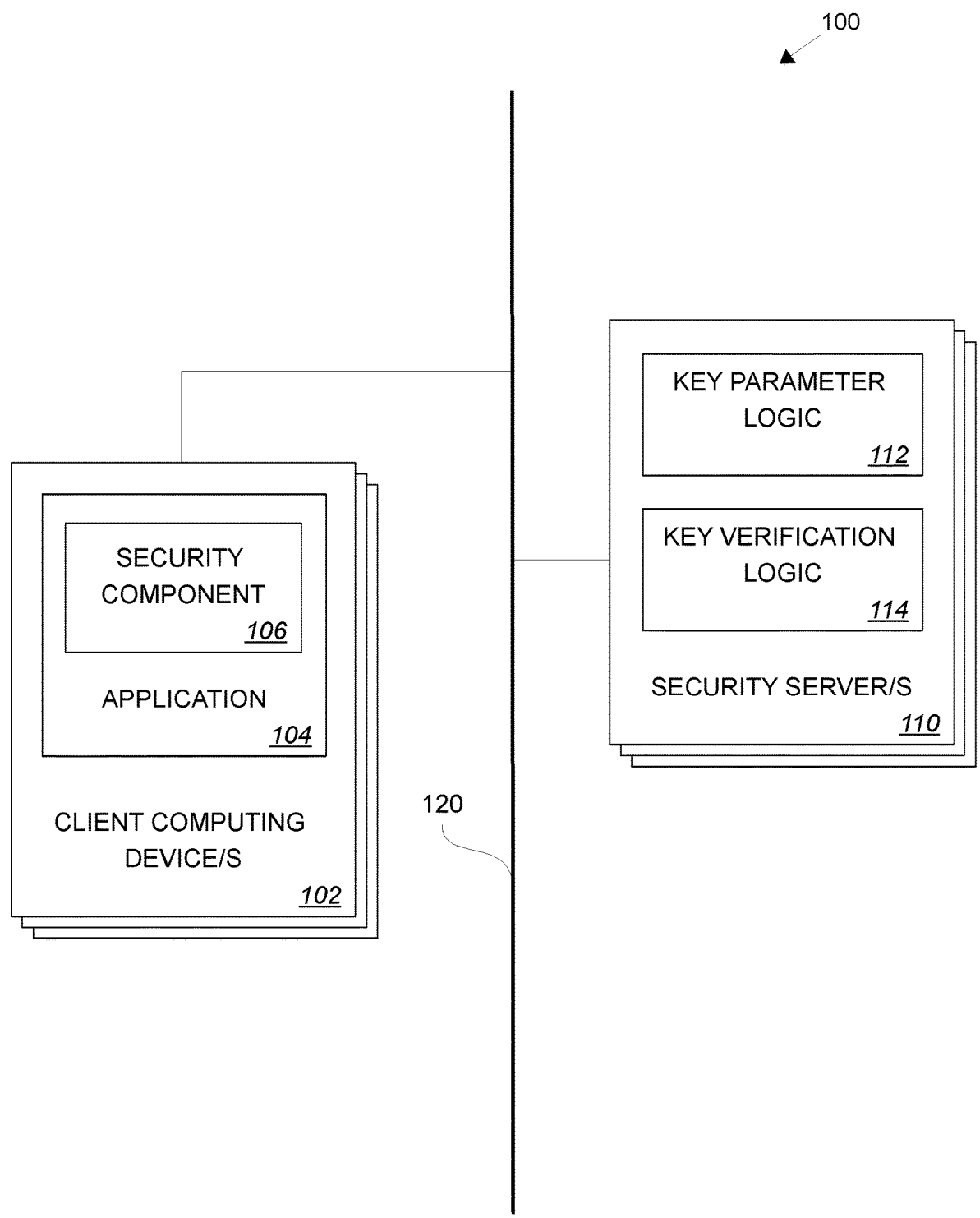
FIG. 1 illustrates a computer system that includes a security server and a client device executing an application with a security component in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

General Overview

This document generally describes systems, methods, devices, and other techniques for client-side security key generation. In general, a security service provider may publish a software developer kit (SDK). The SDK includes a library and optionally software development tools that allow application developers to add a security component to their applications. In some embodiments, the security service provider provides code for the security component in an SDK that it distributes to its customers, such as application developers. The customers can then incorporate the security component into their own application code using the SDK.

The security component includes security code that, when executed on a client device, can generates one or more security keys for one or more requests. In some embodiments, the requests are requests from the application to an application server. The security key is generated in part by executing the security code using input provided to the security component by a security server of the security server provider. The input, referred to herein as a "key component", may have one or more parameter values.

The security server is designed with knowledge of the operation of the security component on the client-side application. The security server also has access to the inputs it provided to the security component (e.g. the one or more parameter values). Thus, the security server has access to the necessary data to validate a security key generated by the security component of the client-side application.

In some embodiments, the security component of the client-side application generates a secret, such as a secret cryptographic key, based on the one or more parameters of the key component provided by the security server. The security component then uses the secret to generate security keys for subsequent requests to an application server, such as by hashing or otherwise encrypting data associated with a particular request using the secret as a cryptographic key. The security server can also generate the same secret as the security component even though the only the parameter value/s of the key component are shared over the network. The security server validates the security key for a particular request using the secret.

In some implementations, the various techniques described herein may achieve one or more of the following advantages: a provider of an application—e.g. a Web application or native application—may better protect its users and itself from fraudsters; the protection may be provided relatively simply for the application provider in certain implementations, such as by simply having the application provider include in its own code a relevant piece of code that it obtains from the security service provider; in particular implementations, such security can be added without the content provider having to install any new hardware or software on its own server systems; the security component code can be provided flexibly by an organization that specializes in web security, which can in turn keep the security component code updated to address ever-changing security threats; such a security organization can also aggregate data received from served security components (e.g. the data that characterizes various clients, along with data that indicates whether they were determined to be legitimate or automated) across many clients that operate many domains, and can use that aggregated information to generate countermeasures that are more effective than countermeasures that could be developed using only data from a single domain. Additional features and advantages are apparent from the specification and the drawings.

System Overview

FIG. 1 illustrates a computer system that includes a security server and a client device executing an application with a security component in an example embodiment. Computer system 100 includes a client computing device 102 configured to execute an application 104 that includes a security component 106. Application 104 may be generated using a software development kit (SDK) that includes features for incorporating the security component 106 in the application 104. For example, a security service provider may generate and provide the SDK to third party application developers. Some examples of application 104 include a web browser executing one or more internal programs (e.g. plug-ins), and a native application developed for use on a particular platform or device. In some embodiments, computing device 102 is a mobile device, such as a mobile device running the Android platform, the Windows Mobile platform, or the iOS platform, and application 104 is a native application developed for the respective mobile platform.

Computer system 100 also includes a security server 110. The security server 110 is designed to interact with the security component 106 of application 104. Interaction causes the security component 106 to generate one or more security keys that can be verified by the security server 110. That is, the security server 110 is able to perform verification based on its knowledge of the operation of the security component 106 as well as its knowledge of the parameters it provided to the security component 106.

The client computing device 102 and security server 110 communicate over a network 120, such as the Internet. Security server 110 includes key parameter logic 112 that communicates with the security component 106 on the client computing device 102 to cause the security component 106 to generate one or more security keys at the client computing device 102. Security server 110 also includes key verification logic 114 that validates security keys. The key parameter logic 112, key verification logic 114, and the generation of one or more security keys by the security component 106 shall be described in greater detail hereinafter.

Client-Side Security Component

Application 104 may include within it or appurtenant to it a security component that corresponds to software executing on the security server 110, such as key parameter logic 112. The security component 106 may have been added to the application 104 by a developer of the application (e.g. a bank that employs its own development team or contracts out development to a third-party). For example, an organization that operates the security server 110 may have published an SDK that it makes available to its customers, and such SDK may include libraries and/or code that the customers may integrate with their own application code. The SDK may additionally include tools and/or instructions on generating an application 104 that includes a security component 106. In some embodiments, the security component 106 is incorporated into and/or downloaded with the application 104, such as via an application store for a particular platform.

Security Server

The security server 110 includes key parameter logic 112 and key verification logic 114. The key parameter logic 112 provides the security component 106 at the client computing device 102 with information that is usable to generate security keys for one or more requests. In some embodiments, the key parameter logic 112 provides, to the security component 106, a key component that includes one or more parameters, such as a string, integer, or other parameter.

The security component 106 includes security code that, when executed with the one or more parameters as input/s, generates one or more security keys for one or more requests. The one or more security keys generated by the security component 106 may be used to obtain services from the organization that developed the application 104, such as banking services and the ability to purchase goods on-line, to submit posts to a social network, or to post comments about goods at an on-line retailer or about entities such as restaurants and hotels.

In some embodiments, the key parameter logic 112 provides a key component that includes two or more parameters, which are provided to the security component 106 in two or more separate messages. In some embodiments, the security component 106 must validate a received parameter before the key parameter logic 112 will provide the next parameter. Such intermediate validation provides further assurance that the application 104 has a valid security component 106.

An example of intermediate validation is given: the security component 106 includes security code that submits an intermediate sum calculation of received parameters to the key parameter logic 112 for validation. For example, the key parameter logic 112 may generate random numbers as parameters to and transmit to the security component 106. If the generated parameters are [4, 2, 8, 5, 3], the key parameter logic 112 first sends '4'. The security component 106 computes an intermediate value '4' that indicates a sum of the received parameters, and transmits the intermediate value to the key parameter logic 112 for validation. The key parameter logic 112 only transmits the next parameter '2' if the correct intermediate value '4' is submitted for validation. Thus, to receive all the parameters, the security component 106 would need to submit the correct intermediate values '4', '6', '14' and '19'.

Because the key parameter logic 112 is designed with knowledge of the operation of the security component 106, and because the key parameter logic 112 has access to the one or more parameters, the key verification logic 114 of the security server 110 is able to validate security keys for requests that the security component 106 generates.

In some embodiments, the security component 106 generates a secret based on the input/s (e.g. the one or more parameters), then uses the secret to generate security keys for one or more subsequent requests. In this case, the security server 110 is able to generate the same secret, and the key verification logic 114 of the security server 110 can validate the security keys using the secret. For example, the security component 106 may compute a secret cryptographic key based on the one or more parameters, then use the secret cryptographic key to hash or otherwise encrypt data associated with a subsequent request. In turn, the key verification logic 114 of the security server 110 can generate the same secret cryptographic key, use the secret cryptographic key to decrypt a security key associated with a particular request, and analyze the decrypted security key to evaluate the data contained therein to determine whether the data corresponds to a valid request.

In some embodiments, the data includes at least a portion of the request itself, such that the received request would not constitute a full request that can be completed when the security key is not valid.

In some embodiments, the data associated with the request comprises data available at the client computing device 102, such as time information, duration information, device motion information, cursor movement information, or any other data available at the client computing device 102. The data may be collected from one or more sensors coupled with the client computing device 102.

In-Line Security Server

Figure 2:
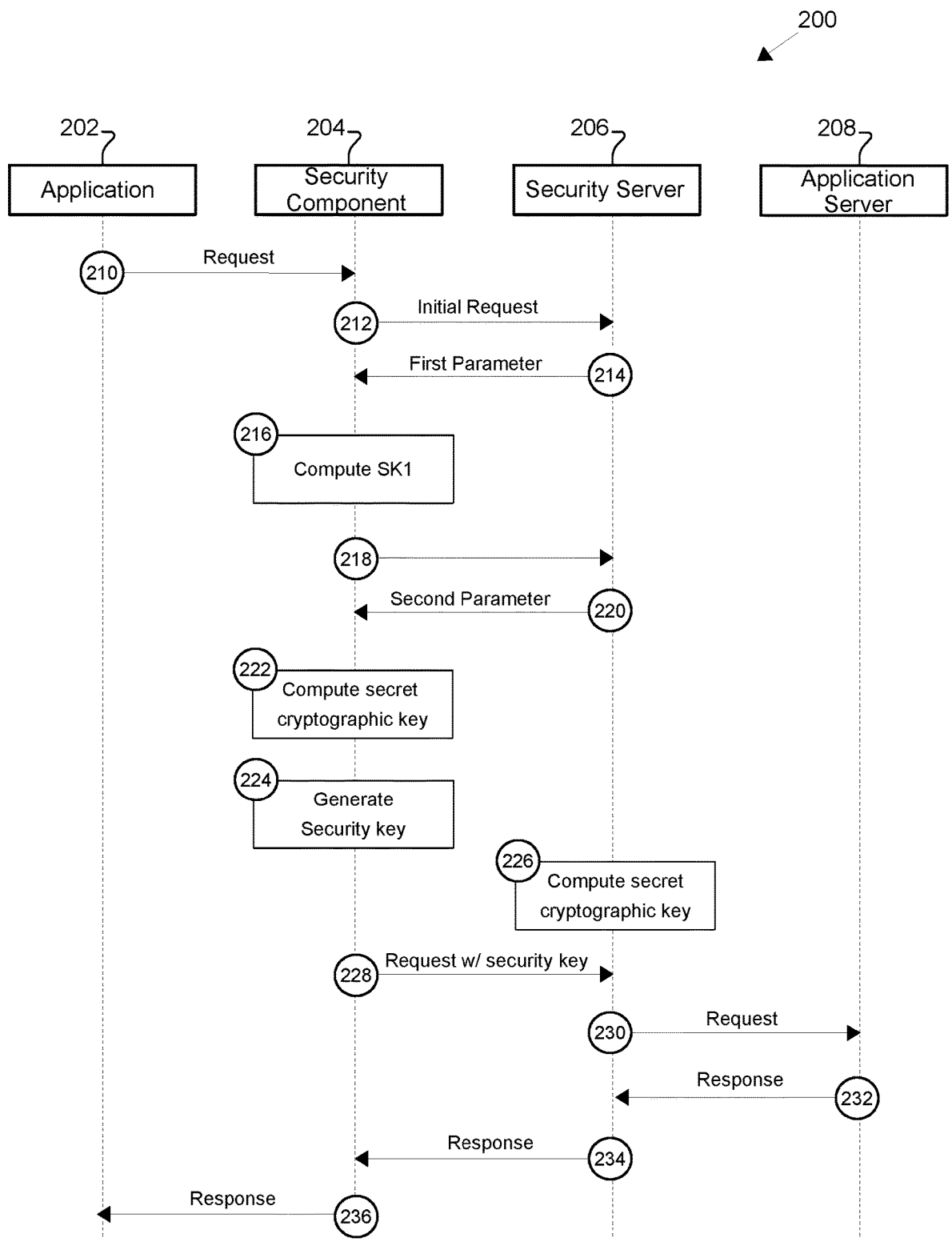
FIG. 2 is an activity diagram of a process for key generation and key validation in an example embodiment that utilizes an in-line security server.

FIG. 2 is an activity diagram of a process for key generation and key validation in an example embodiment that utilizes an in-line security server. Process 200 involves a client-side application 202 that includes a security component 204, a security server 206, and an application server 208. The application server 208 is positioned in the network as an in-line device. In the in-line security server configuration, requests from the application 302 are transmitted to the security server 206, which forwards valid requests for processing by the application server 208.

At step 210, the client-side application 202 initiates a request directed to the application server 208. The request is handled by the security component 204 of the client-side application 202. At step 212, the security component 204 transmits an initial request to the security server 206. The initial request initiates a process to obtain information usable to generate one or more security keys for one or more requests. For example, in process 200, the initial request initiates a process to obtain two parameters to compute, at the client device, a secret cryptographic key that is usable to generate one or more security keys for one or more requests.

In response to the initial request, the security server 206 generates and transmits information to the client-side application 202 that enables the client-side application 202 to generate a valid security key for the request. For example, the security server 206 may generate a key component that includes one or more parameters from which a valid key can be generated at the client device by executing the security code. In process 200, the key component includes two parameters that are transmitted in two separate messages. At step 214, the security server 206 transmits the first parameter of the key component to the security component 204 of the client-side application 202. At step 216, the security component 204 generates a first sub-key SK1 based on the first parameter. At step 218, the security component 204 transmits information to the security server 206 indicating that it is ready for a next parameter of the key component.

At step 220, the security server 206 transmits the second parameter of the key component to the security component 204 of the client-side application 202. In some embodiments, the information transmitted at step 218 must show that the security component 204 is valid before the second parameter is transmitted at step 220. For example, the security server 206 may expect a valid security component 204 generated using an SDK to produce a certain value using the first parameter. In some embodiments, the information transmitted at step 218 includes the first sub-key SK1 or other data generated based on SK1, and the security server 206 checks the validity of this information. In some embodiments, a sub-key is generated for each transmission of a key component in order to obtain the next key component. In process 200, because the key component includes two parameters, no sub-key is generated based on the second parameter because the second parameter is the last parameter, and no validation is required to obtain a subsequent parameter. In some embodiments, the number of parameters is not determinable by the security component 204 until the security server transmits a message indicating that no more parameters will be transmitted.

At step 222, the security component 204 of the client-side application 202 computes a secret cryptographic key based on parameters of the key component received in steps 214 and 220. At step 224, the security component 204 generates a security key corresponding to the request using the secret cryptographic key. For example, the security component 204 may sign the request using the cryptographic key. In some embodiments, the security component 204 uses the secret cryptographic key to generate a particular security key for a particular request by hashing or otherwise encrypting data associated with the particular request using the secret cryptographic key.

At step 226, the security server 208 independently computes the secret cryptographic key based on the first parameter and the second parameter generated by the security server 208 at steps 214 and 220. The security server 206 has the necessary information about the security component 204 to compute the same secret cryptographic key generated by the security component 204 based on the same input (e.g. first parameter and second parameter). Thus, the secret cryptographic key does not need to be transmitted to the application 202 over a network. The client-side application 202 can generate a valid security key and the security server 206 can validate the security key, even though the secret was never transmitted over a network to the client device.

At step 228, the security component 204 of the client-side application 202 forwards the request, including the security key, to the security server 206. In some embodiments, a portion of the request may be conveyed by information in the security key, and would not need to appear separately from the security key in the request.

At step 230, the security server 206 validates the security key received in the request and forwards valid requests to the application server 208. The security server 206 is able to validate the security key using the independently-computed secret cryptographic key.

At steps 232-236, the application server 208 generates a response to valid requests received, and the response is transmitted to the client-side application 202. For example, in process 200, the application server transmits the response to the security server at step 232, which forwards the response to the security component 204 at step 234, which makes the response available to a process of the client-side application 202 that expects a response to the request at step 236.

In some embodiments, security component 204 of the client-side application 202 also uses the secret cryptographic key to sign subsequent requests by the application 202.

Out-of-Band Security Server

Figure 3:
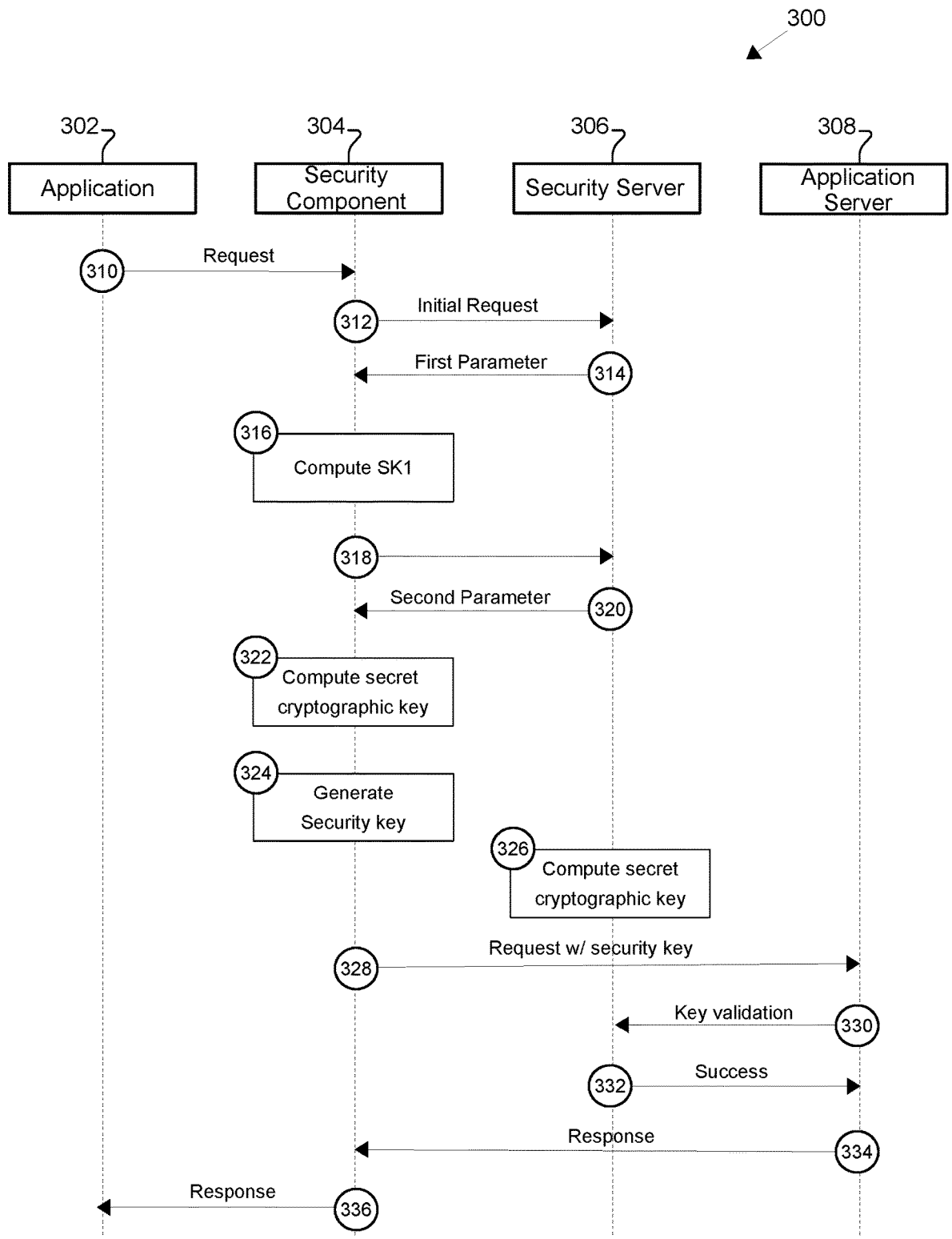
FIG. 3 is an activity diagram of a process for key generation and key validation in an example embodiment that utilizes an out-of-band security server.

FIG. 3 is an activity diagram of a process for key generation and key validation in an example embodiment that utilizes an out-of-band security server. Process 300 involves a client-side application 302 that includes a security component 304, a security server 306, and an application server 308. The application server 308 is positioned in the network as an out-of-band device. In the out-of-band security server configuration, requests from the application 302 are transmitted directly to the application server 308.

At step 310, the client-side application 302 initiates a request directed to the application server 308. The request is handled by the security component 304 of the client-side application 302. At step 312, the security component 304 transmits an initial request to the security server 306. The initial request initiates a process to obtain information usable to generate one or more security keys for one or more requests. For example, in process 300, the initial request initiates a process to obtain two parameters to compute, at the client device, a secret cryptographic key that is usable to generate one or more security keys for one or more requests.

In response to the initial request, the security server 306 generates and transmits information to the client-side application 302 that enables the client-side application 302 to generate a valid security key for the request. At step 314, the security server 306 transmits a first parameter of the key component to the security component 304 of the client-side application 302. At step 316, the security component 304 generates a first sub-key SK1 based on the first parameter. At step 318, the security component 304 transmits information to the security server 306 indicating that it is ready for a next parameter of the key component. At step 320, the security server 306 transmits a second parameter of the key component to the security component 304 of the client-side application 302. In some embodiments, the information transmitted at step 318 must show that the security component 304 is valid before the second parameter is transmitted at step 320.

At step 322, the security component 304 of the client-side application 302 computes a secret cryptographic key based on parameters of the key component received in steps 314 and 320. At step 324, the security component 304 generates a security key corresponding to the request using the secret cryptographic key. For example, the security component 304 may sign the request using the cryptographic key. At step 324, the security component 304 of the client-side application computes a security key for the request using the one or more parameters of the key component received from the security server 306. At step 326, the security server 308 independently computes the secret cryptographic key based on the first parameter and the second parameter generated by the security server 308 at steps 314 and 320.

At step 328, the security component 304 of the client-side application 302 forwards the request generated by the application 302 to the application server 308. The forwarded request includes the security key generated by the security component 304. At step 330, the application sends the security key to the security server 306 for validation by the security server 306. The security server 306 is able to validate the security key because the security server 306 has knowledge of the operation of security component 304 in the client-side application 302, and also knows the inputs (e.g. the first parameter and the second parameter) transmitted to the security component 304. Thus, both the security server 306 and the client-side application 302 are able to generate the same secret (e.g. a secret cryptographic key) so that the client-side application 302 can generate a valid security key and the security server 306 can validate the security key, even though the secret was never transmitted over a network to the client device. At step 332, the security server 306 validates the security key and returns success or failure to the application server 308.

At steps 334-336, the application server 308 generates a response to valid requests received, and the response is transmitted to the client-side application 302. For example, in process 300, the application server 308 transmits the response to the security component 304 at step 334, which makes the response available to a process of the client-side application 302 that expects a response to the request at step 336.

In some embodiments, a system including multiple security servers 306 handles requests corresponding to the in-line security server configuration as well as requests corresponding to the out-of-band security server configuration. For example, the system may include one or more in-line security servers and one or more out-of-band security servers. Alternatively and/or in addition, the system may include a security server that is capable of handling both requests corresponding to the in-line security server configuration as well as requests corresponding to the out-of-band security server configuration.

Integration with Additional Security Countermeasures

One or more security servers 110 may be adapted to perform deflection and detection of malicious activity with respect to a web server system by serving code for security countermeasures to a web browser or other application executing on a client device that is or will be running the served code. For example, a security server 110 may serve polymorphic code and/or instrumented code. A security server may evaluate HTTP requests from a client computing device 102 to an application server 110 and perform particular actions on code returned by the application server 110 before such code is served back to a client computing device 102.

When such code returns, stored policy information may be used to match the content to be delivered, across multiple content types (e.g. HTML, JavaScript, and CSS), to actions to be taken on the content (e.g. using XPATH within a DOM), such as substitutions, addition of content, and other actions that may be provided as extensions to the system. For example, the different types of content may be analyzed to determine naming that may extend across such different pieces of content (e.g. the name of a function or parameter), and such names may be changed in a way that differs each time the content is served, e.g. by replacing a named item with randomly-generated characters. Elements within the different types of content may also first be grouped as having a common effect on the operation of the code (e.g. if one element makes a call to another), and then may be re-encoded together in a common manner so that their inter-operation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed.

A key for the function that encodes and de-codes such strings can be maintained by the security server 110 along with an identifier for the particular client computer so that the security server 110 may know which key or function to apply, and may otherwise maintain a state for the client computer and its session. A stateless approach may also be employed, whereby the security server 110 encrypts the state and stores it in a cookie that is saved at the relevant client computer. The client computer may then pass that cookie data back when it passes the information that needs to be de-coded back to its original status. With the cookie data, the system 202 may use a private key to decrypt the state information and use that state information in real-time to de-code the information from the client computer. Such a stateless implementation may create benefits such as less management overhead for the security server 110 (e.g. for tracking state, for storing state, and for performing clean-up of stored state information as sessions time out or otherwise end) and as a result, higher overall throughput.

In some implementations, the security component 102 of the application 104 generates a security key for a request by encrypting the corresponding state information (e.g. the cookie) using the secret cryptographic key generated by the security component 106 at the client computing device 102. At the security server 110, the key verification logic 114 decrypts the security key using the secret cryptographic key to generate the state information, which in turn specifies how the security server should apply reverse transformations to the request to de-obfuscate the request before forwarding the request to the application server associated with the requesting application 104.

Example Processes

Figure 4:
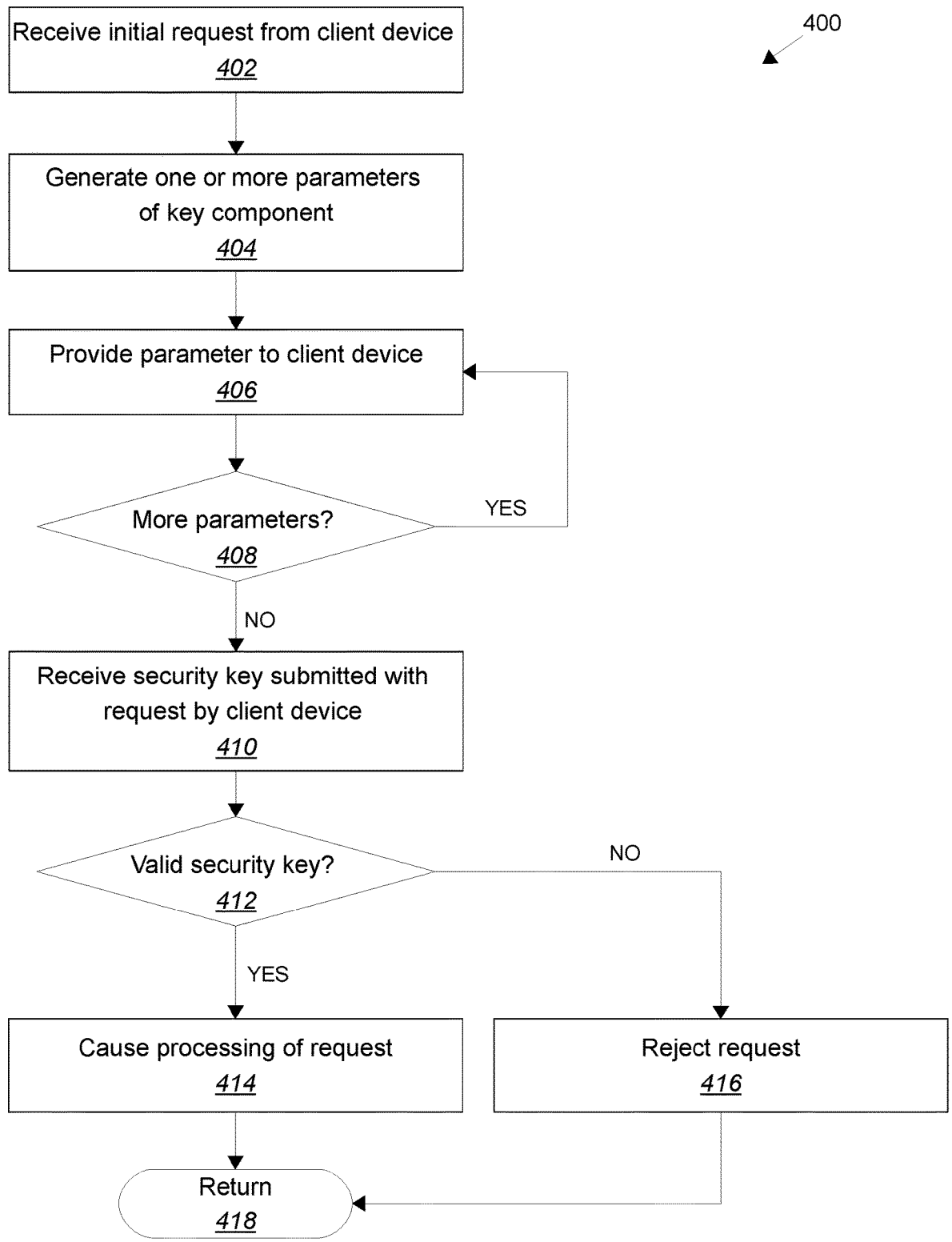
FIG. 4 is a flow diagram of a process for causing a client-side application to generate a security key and for validating the security key in an example embodiment.

FIG. 4 is a flow diagram of a process for causing a client-side application to generate a security key and for validating the security key in an example embodiment. Process 400 may be performed by one or more computing devices and/or processes thereof. For example, one or more blocks of process 400 may be performed by computer system 600. In one embodiment, one or more blocks of process 400 are performed by a security server executing on a computing system, such as security server 110. Process 400 will be described with respect to security server 110, but is not limited to performance by security server 110.

At block 402, security server 110 receives an initial request from a client device 102. The initial request initiates a process to obtain information usable to generate one or more security keys for one or more requests.

At block 404, security server 110 generates one or more parameters of a key component. The client device 102 includes a security component 106 that can generate a security key to validate a request directed to an application server 104. At block 406, the security server 110 provides a parameter to the client device 102. At decision block 408, the security server 110 determines whether more parameters remain to transmit to the client device 102. When more parameters remain, processing continues to block 406. Otherwise, if no more parameters remain to transmit to the client device 102, processing continues to block 410.

At block 410, the security server 110 receives a security key submitted with a request by the client device 102. The security key is generated based on the one or more parameters of the key component, and is generated by the security component 106 of an application 104 running on the client device 102. The security key may be submitted to the security server 110 by the client device (e.g. in an in-line security server configuration) or an application server that received the request from the client device 102 (e.g. in an out-of-band security server configuration).

At decision block 412, the security server 110 determines whether the security key included with the request is a valid security key. When the security key is a valid security key, processing continues to block 414. At block 414, the security server 110 causes processing of the corresponding request. For example, when the security key is received from a client device 102 in an in-line security server configuration, the security server 110 may forward the request to an application server; when the security key is received from an application server in an out-of-band security server configuration, the security server 110 may notify the application server that the security key is valid, causing the application server to process the request.

Returning to decision block 412, when the security key is not a valid security key, processing continues to block 416. At block 416, the security server 110 rejects the request. For example, when the security key is received from a client device 102 in an in-line security server configuration, the security server 110 may only forward valid requests; when the security key is received from an application server in an out-of-band security server configuration, the security server 110 may notify the application server that the security key is invalid. In the latter case, the application server will not process the request.

At block 418, process 400 returns and/or terminates. For example, process 400 may pass control to a calling process, generate any appropriate record or notification, return after a method or function invocation, process a next operation requested by a client device, or terminate.

Figure 5:
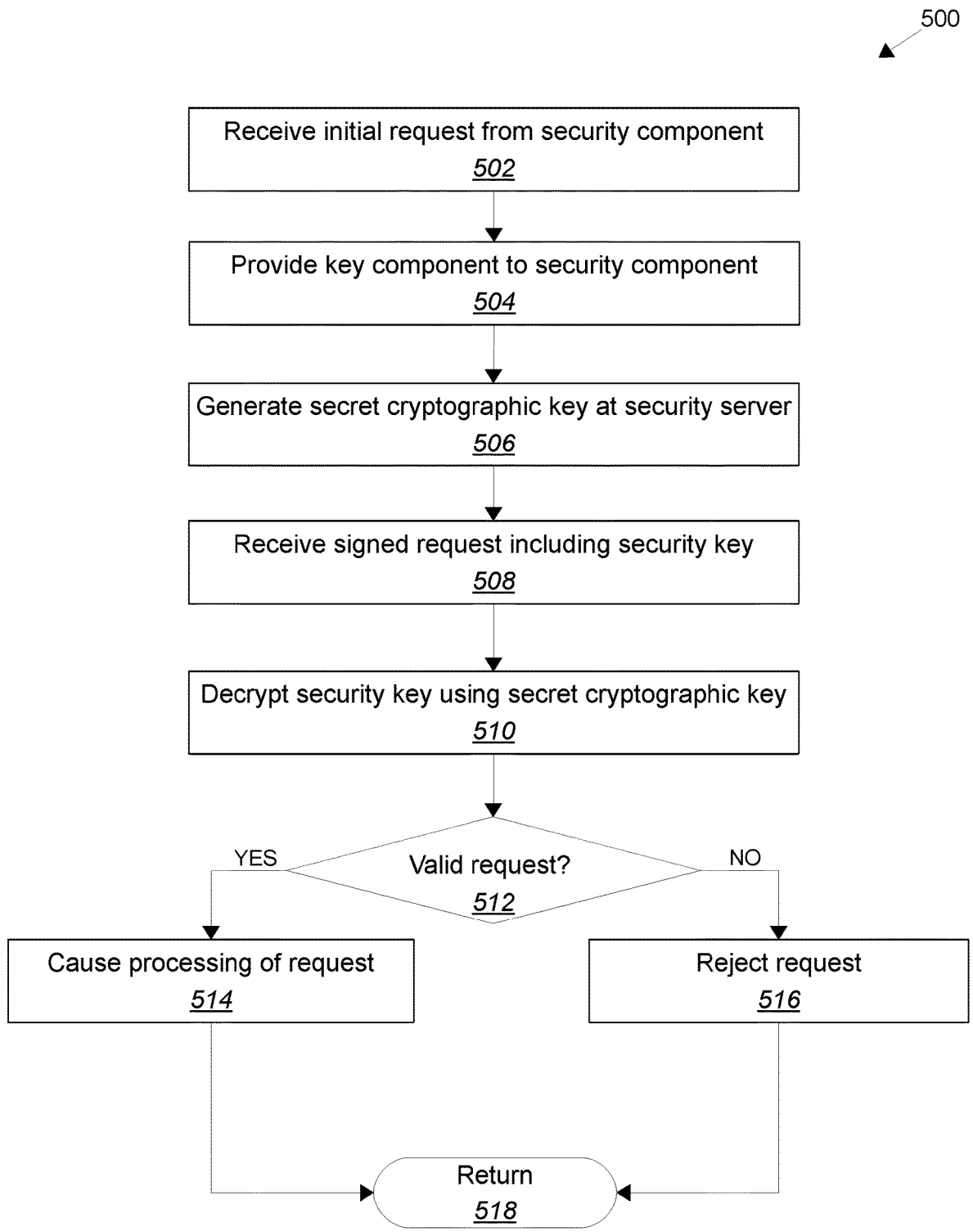
FIG. 5 is a flow diagram of a process for causing a client-side application to generate a secret cryptographic key and for validating subsequent signed requests in an example embodiment.

FIG. 5 is a flow diagram of a process for causing a client-side application to generate a secret cryptographic key and for validating subsequent signed requests in an example embodiment. Process 500 may be performed by one or more computing devices and/or processes thereof. For example, one or more blocks of process 500 may be performed by computer system 600. In one embodiment, one or more blocks of process 500 are performed by a security server executing on a computing system, such as security server 110. Process 500 will be described with respect to security server 110, but is not limited to performance by security server 110.

At block 502, security server 110 receives an initial request from a security component 106 of an application 104 executing on a client device 102. The initial request initiates a process to obtain information usable to generate one or more security keys for one or more requests. At block 404, security server 110 provides a key component comprising one or more parameters to the security component 106.

At block 506, the security server 110 generates a secret cryptographic key at the security server 110. The security component 106 also independently computes the same secret cryptographic key at the client device 102 based on the one or more parameters provided by the security server 110. The security server 206 has the necessary information about the security component 106 to compute the same secret cryptographic key based on the same input (e.g. the one or more parameters).

At block 508, the security server 110 receives a signed request that includes a security key generated by applying the secret cryptographic key to data associated with the request. At block 510, the security server decrypts the security key in the signed request using the secret cryptographic key.

At decision block 512, the security server 110 determines whether the request is valid based on the decrypted security key. For example, the request may be invalid if particular data in the decrypted security key doesn't match particular data in the request. Alternatively and/or in addition, the security server may analyze data in the decrypted security key to determine if the data satisfies one or more rules that indicate that the request was not automatically triggered by malware. When the security server 110 determines that the request is valid, processing continues to block 514. At block 514, the security server 110 causes processing of the corresponding request. Returning to decision block 512, when the security server determines that the request is not valid, processing continues to block 516. At block 516, the security server 110 rejects the request.

At block 518, process 500 returns and/or terminates. For example, process 500 may pass control to a calling process, generate any appropriate record or notification, return after a method or function invocation, process a next operation requested by a client device, or terminate.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 6:
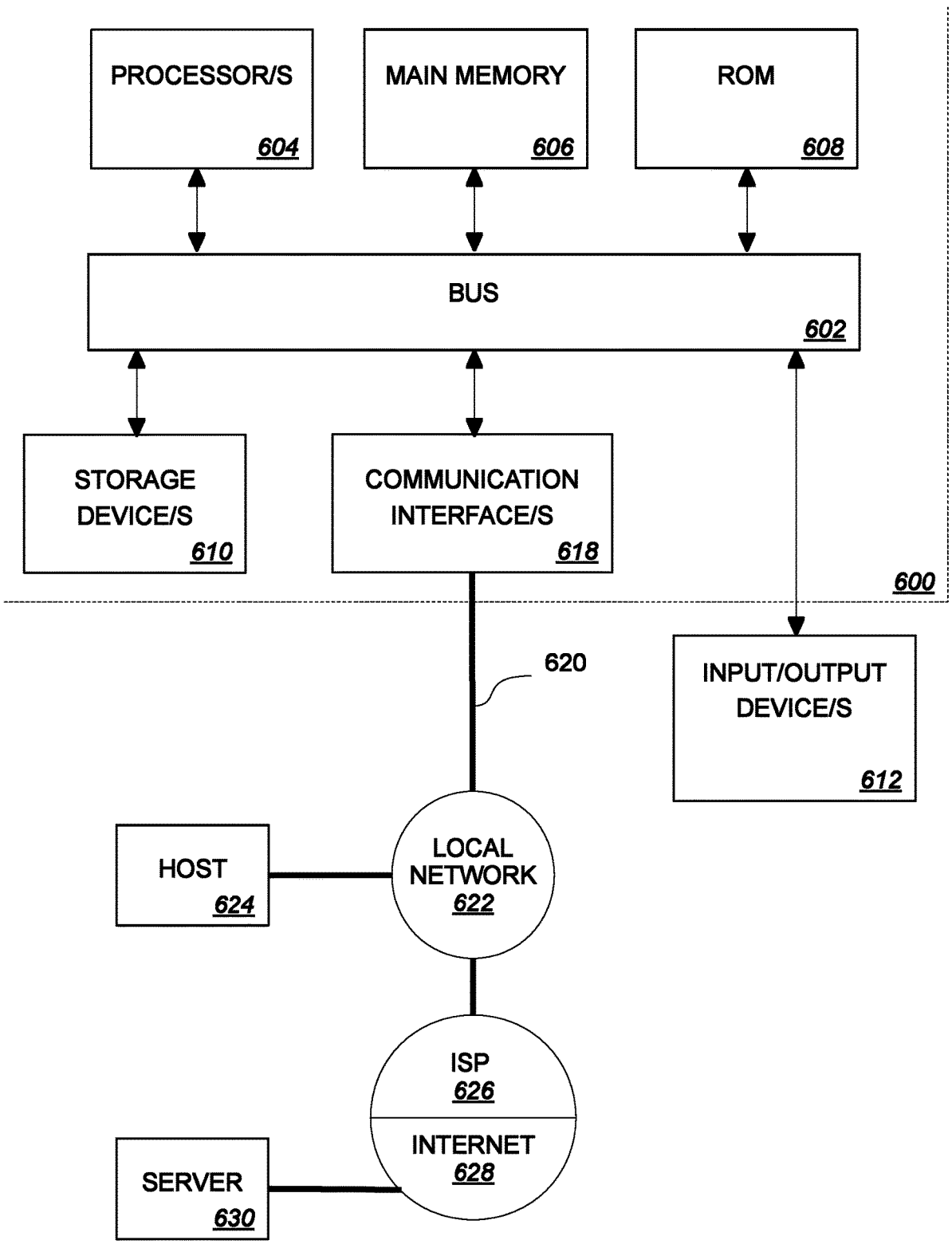
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to one or more input/output (I/O) devices 612. For example, I/O devices 612 may include one or more displays for displaying information to a computer user, such as a cathode ray tube (CRT) display, a Liquid Crystal Display (LCD) display, a Light-Emitting Diode (LED) display, a projector, and/or any other type of display.

I/O devices 612 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 604 and for controlling cursor movement on another I/O device (e.g. a display). This input device typically has two degrees of freedom in two axes, a first axis (e.g. x) and a second axis (e.g. y), that allows the device to specify positions in a plane. In some embodiments, the one or more I/O devices 612 may include a device with combined I/O functionality, such as a touch-enabled display.

Other I/O devices 612 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor 604 over bus 602.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, or stored in storage device 610, or other non-volatile storage for later execution.

OTHER ASPECTS OF DISCLOSURE

Using the networked computer arrangements, intermediary computer, or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
receiving an initial request to access an application server by an application executing on a client device, the application including a security component comprising security code that operates on at least one parameter value;
in response to the initial request, providing the application one or more parameter values comprising a first parameter from which the security component can generate a secret cryptographic key at the client device by executing the security code by processing the first parameter with other data available at the client device;
receiving a security key used to sign a signed request by the application to the application server, the security key comprising data associated with the signed request that is encrypted using the secret cryptographic key;
generating the secret cryptographic key independently of the client device;
decrypting the security key after independently generating the secret cryptographic key;
checking if the security key is valid by using the secret cryptographic key to decrypt the security key and, after decrypting, analyzing the security key to determine whether the security key contains data collected at the client device that does not match a pattern of data collected when the request is generated by malware executing on the client device;

in response to determining that the security key is valid, causing processing of the request by the application server;

wherein the method is performed by one or more processors.

2. The method of claim 1, wherein the application is generated based on a software development kit (SDK) provided to a developer of the application, wherein the SDK includes features for incorporating the security component in the application.

3. The method of claim 1:
wherein the one or more parameter values includes a second parameter;
wherein providing the one or more parameter values to the device comprises providing the first parameter in a first message and providing the second parameter in a second message;
wherein the secret cryptographic key is generated by the security component of the application by executing the security code by processing the first parameter and the second parameter with other data available at the client device.

4. The method of claim 1, further comprising receiving the signed request from the client device, wherein the security key is received from the client device in conjunction with the request to the application server, wherein causing processing of the request by the application server comprises forwarding the signed request to the application server.

5. The method of claim 1:
wherein the security key is received from the application server after the application server receives the signed request comprising the security key from the client device;
wherein causing processing of the signed request by the application server comprises notifying the application server that the security key is valid;
wherein the application server processes the signed request after being notified that the security key is valid.

6. The method of claim 1,
wherein checking if the security key is valid comprises using the secret cryptographic key to decrypt the security key and determining whether the security key contains valid data associated with the request.

7. The method of claim 1, further comprising:
receiving a second security key used to sign a second signed request by the application to the application server, the second security key comprising data associated with the second signed request that is encrypted by the security component using the secret cryptographic key;
checking if the second security key is valid by using the secret cryptographic key to decrypt the second security key and determining whether the second security key includes valid data associated with the second signed request;
in response to determining that the second security key is valid, causing processing of the second request.

8. A computer system comprising:
one or more hardware processors;
a memory coupled to the one or more hardware processors and storing one or more instructions which, when executed by the one or more hardware processors, cause the one or more hardware processors to:
receive an initial request to access an application server by from an application executing on a client device, the application including a security component comprising security code that operates on at least one parameter value;
in response to the initial request, providing the application one or more parameter values comprising a first parameter from which the security component can generate a secret cryptographic key at the client device by executing the security code by processing the first parameter with other data available at the client device;
receive a security key used to sign a signed request by the application to the application server, the security key comprising data associated with the signed request that is encrypted using the secret cryptographic key;
check if the security key is valid by using the secret cryptographic key to decrypt the security key and, after decrypting, analyzing the security key to determine whether the security key contains data collected at the client device that does not match a pattern of data collected when the request is generated by malware executing on the client device;
in response to determining that the security key is valid, cause processing of the request by the application server.

9. The computer system of claim 8, wherein the application is generated based on a software development kit (SDK) provided to a developer of the application, wherein the SDK includes features for incorporating the security component in the application.

10. The computer system of claim 8:
wherein the one or more parameter values includes a second parameter;
wherein providing the one or more parameter values to the device comprises providing, first parameter in a first message and providing, the second parameter in a second message;
wherein the secret cryptographic key is generated by the security component of the application by executing the security code by processing the first parameter and the second parameter with other data available at the client device.

11. The computer system of claim 8, further comprising receiving the signed request from the client device, wherein the security key is received from the client device in conjunction with the request to the application server, wherein causing processing of the request by the application server comprises forwarding the signed request to the application server.

12. The computer system of claim 8:
wherein the security key is received from the application server after the application server receives the signed request comprising the security key from the client device;
wherein causing processing of the signed request by the application server comprises notifying the application server that the security key is valid;
wherein the application server processes the signed request being notified that the security key is valid.

13. The computer system of claim 8: wherein checking if the security key is valid comprises using the secret cryptographic key to decrypt the security key and determining whether the security key contains valid data associated with the request.

14. The computer system of claim 8, wherein the one or more instructions, when executed by the one or more hardware processors, cause the one or more hardware processors to: receive a second security key used to sign a second signed request by the application to the application server, the second security key comprising data associated with the second signed request that is encrypted by the security component using the secret cryptographic key check if the second security key is valid by using the secret cryptographic key to decrypt the second security key and determine whether the second security key includes valid data associated with the second signed request; in response to determining that the second security key is valid, cause processing of the second request.

15. The method of claim 6, wherein the valid data associated with the request includes at least one of time information, duration information, device motion information, and cursor movement information.

16. The method of claim 6, wherein the valid data associated with the request is collected from one or more sensors coupled with the client device.

17. The system of claim 6, wherein the valid data associated with the request includes at least one of time information, duration information, device motion information, and cursor movement information.

18. The system of claim 6, wherein the valid data associated with the request is collected from one or more sensors coupled with the client device.

\* \* \* \* \*